Figure 1:
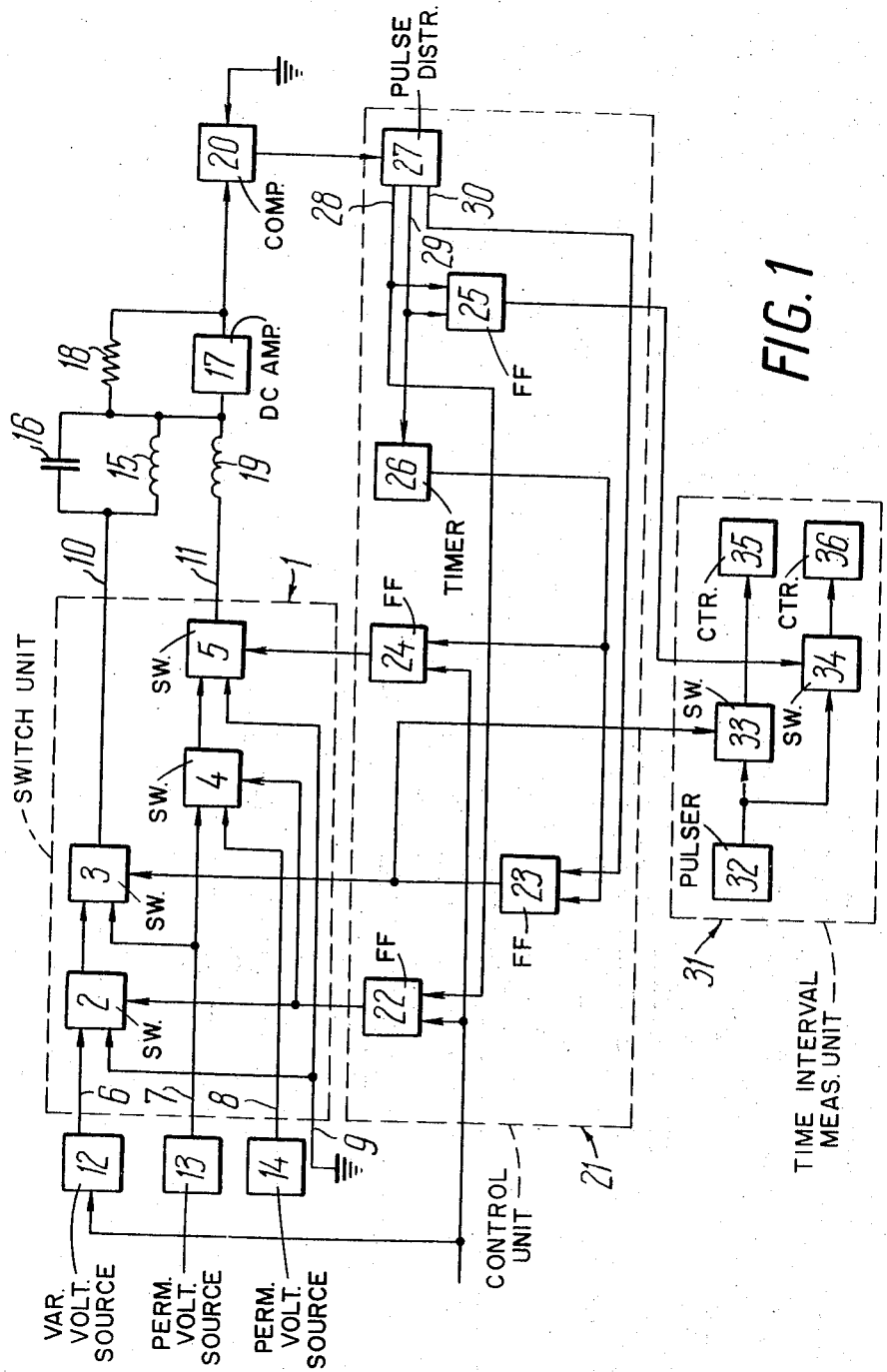

United States Patent [19]
Martyashin et al.

[11] 3,824,458
[45] July 16, 1974

[54] DEVICE FOR MEASURING PARAMETERS OF ELEMENTS OF PARALLEL LC-CIRCUIT

[76] Inventors: Alexandr Ivanovich Martyashin, ulitsa Kirova, 69, kv. 59; Andrei Elizarovich Morozov, Uritskogo 44/10; Eduard Konstantinovich Shakhov, ulitsa Gladkova, 13, kv. 5; Viktor Mikhailovich Shlyandin, ulitsa Lermontova, 12, kv. 17, all of Penza, U.S.S.R.

[22] Filed: Jan. 22, 1973

[21] Appl. No.: 325,927

[52] U.S. Cl. .................................. 324/57 P
[51] Int. Cl. ................................. G01r 27/00
[58] Field of Search ........................ 324/57 R

[56] References Cited
UNITED STATES PATENTS

| | | | |
|---|---|---|---|
| 2,577,592 | 12/1951 | Shiepe | 324/57 R |
| 2,604,511 | 7/1952 | Marzolf | 324/57 R |
| 2,626,981 | 1/1953 | Shiepe | 324/57 R |
| 3,017,571 | 1/1962 | Moricca et al. | 324/57 R X |
| 3,432,752 | 3/1969 | Frederickson et al. | 324/57 R |
| 3,480,857 | 11/1969 | Bialko et al. | 324/57 R |
| 3,624,494 | 11/1971 | Turan | 324/57 R |

*Primary Examiner*—Stanley T. Krawczewicz
*Attorney, Agent, or Firm*—Waters, Roditi, Schwartz & Nissen

[57] ABSTRACT

For measuring the parameters of the elements of a parallel LC-circuit, an apparatus which comprises a switching unit the first input whereof is connected to a source of linearly varying voltage, started by an external signal. A second input of the switching unit is connected to a source of permanent voltage. A third input is connected to a source of permanent voltage of the opposite polarity, and the fourth input is grounded. A DC amplifier with a parallel resistive negative feedback has an input is connected through the parallel LC-circuit to the first input of the switching unit and is also connected through a reference inductance coil to the second input of the switching unit. The device further comprises a comparison unit connected to the output of the DC amplifier, a control unit connected to the output of the comparison unit and a time interval measuring unit connected to the output of the control unit. At the moment of the arrival of an external signal, the first output of the switching unit is connected to the first input thereof, and the second output of the switching unit is connected to the second input thereof. At the moment when the output voltage of the DC amplifier equals zero for the first time, the first output of the switching unit is connected to the fourth input thereof, and the second output of the switching unit is connected to the third input thereof. Following a metered time interval after the moment when the output voltage of the DC amplifier equals zero for the second time, the first output of the switching unit is connected to the second input thereof, and the second output of the switching unit is connected to the fourth input thereof. At the moment when the output voltage of the DC amplifier equals zero for the third time, the first output of the switching unit is connected to the fourth input thereof.

1 Claim, 2 Drawing Figures

DEVICE FOR MEASURING PARAMETERS OF ELEMENTS OF PARALLEL LC-CIRCUIT

The invention relates to the art of electric measurements, and, more particularly, it relates to a device for measuring the parameters of the elements of a parallel LC-circuit.

The herein disclosed device for measuring the parameters of the elements of a parallel LC-circuit is employed preferably for measuring the parameters of the elements of resonance parallel LC-circuits incorporated in various radioelectronic devices, for measuring thick- and thin-film LC-elements, as well as for measuring signals of various LC-transducers, sensors and microsensors.

No similar device for measuring the parameters of the elements of a parallel LC-circuit has been hitherto known.

It is an object of the present invention to provide device for measuring the parameters of the elements of a parallel LC-circuit, within a relatively short time interval and to a high accuracy.

This object is attained in a device for measuring the parameters of the elements of a parallel LC-circuit, comprising a switching unit the first input whereof is connected to a source of a linearly varying voltage, started by an external signal, the second input of said switching unit being connected to a source of permanent voltage, the third input of said switching unit being connected to a source of permanent voltage of the opposite polarity, the fourth input of said switching unit being grounded, a DC amplifier with a parallel resistive negative feedback the input whereof is connected through a parallel LC-circuit to the first output of said switching unit and is also connected through a reference inductance coil to the second output of said switching unit, a comparison unit connected to the output of said DC amplifier, a control unit connected to the output of said comparison unit, and a source of metered time intervals connected to the output of said control unit at the moment when the output voltage of said DC amplifier equals zero, said comparison unit sends signals to said control unit to change the state of said switching unit. At the moment of the arrival of an external signal, the first output of said switching unit is connected to the first input thereof, and the second output of said switching unit is connected to the second input thereof. When the first signal arrives from said comparison unit, the first output of said switching unit is connected to the fourth input thereof, and the second output of said switching unit is connected to the third input thereof. Following a metered time interval after the arrival of the second signal from said comparison unit, the first output of said switching unit is connected to the second input thereof, and the second output of said switching unit is connected to the fourth input thereof. When the third signal arrives from said comparison unit, the first output of said switching unit is connected to the fourth input thereof. Said control unit controls the operation of a time interval measuring unit so that the initial moment of the first measured time interval employed for determining the parameter of one of the elements of said parallel LC-circuit coincides with the arrival of the first signal from said comparison unit, the final moment of said first measured time interval coinciding with the arrival of the second signal from said comparison unit. The initial moment of the second measured time interval employed for determining the parameter of the other element of said parallel LC-circuit coincides with the final moment of the metered time interval, the final moment of said second measured time interval coinciding with the arrival of the third signal from said comparison unit.

The herein disclosed device enables measuring the parameters of a parallel LC-circuit within a relatively short time interval and to a sufficiently high accuracy, and is simple in design and small in size.

Figure 2:
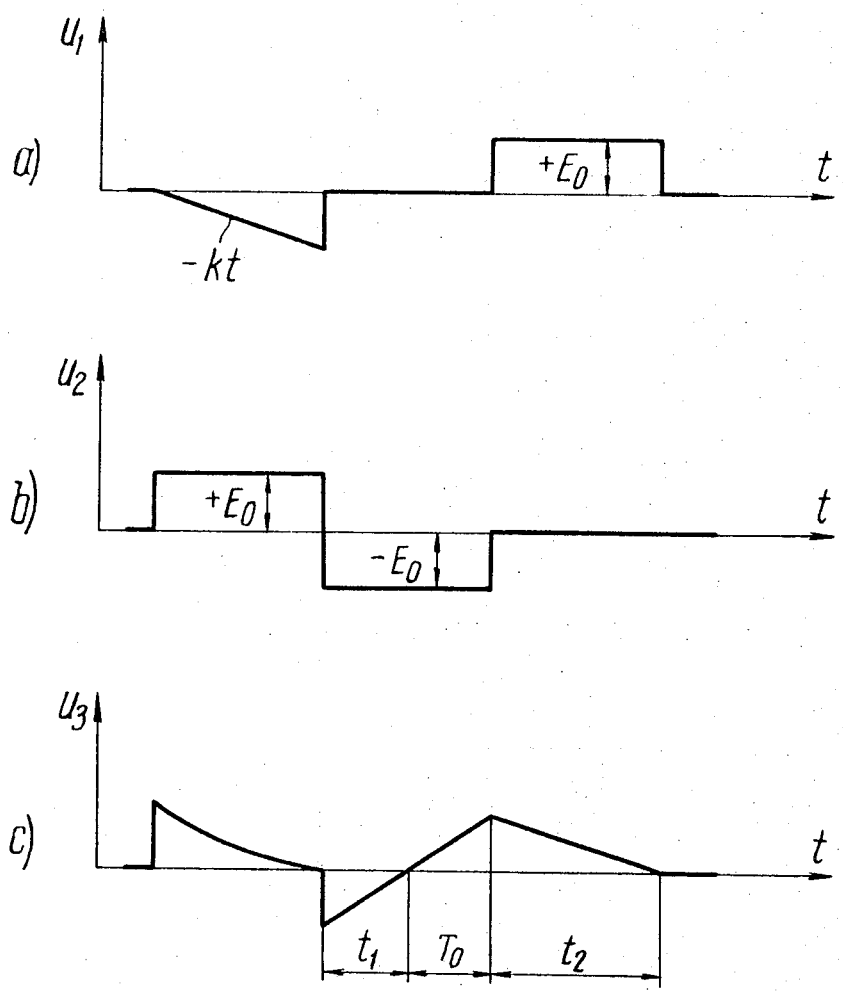

The present invention will be further described with reference to the accompanying drawings, wherein:

FIG. 1 is a block unit diagram of the novel device for measuring the parameters of the elements of a parallel LC-circuit, in accordance with the invention; and FIG. 2 shows time diagrams "a," "b" and "c" of the voltages $U_1$, $U_2$, $U_3$, respectively, across the first output of the switching unit, across the second output thereof and across the output of an associated DC amplifier.

Referring now in particular to the appended drawings, the device for measuring the parameters of the elements of a parallel LC-circuit includes a switching unit 1 (FIG. 1) including electronic switches 2, 3, 4 and 5, each of these switches including a conventional circuit with two transistors. The first input 6 of the switching unit 1 is the input of the electronic switch 2, the second input 7 of the switching unit 1 is the direct connection between the inputs of the electronic switches 3 and 4, the third input 8 of the switching unit 1 is the other input of the electronic switch 4, the fourth input 9 of the switching unit 1 is the direct connection between the other input of the electronic switch 2 and the input of the electronic switch 5.

The first output 10 of the switching unit 1 is the output of the switch 3, whereas the second output 11 of the switching unit 1 is the output of the switch 5. The output of the switch 2 is connected to the other input of the switch 3, while the output of the switch 4 is connected to the other input of the switch 5.

The first input 6 of the switching unit 1 is connected to the output of a linearly varying voltage source 12, to the input whereof there can be supplied a signal from an external source (not shown); the second input 7 of the switching unit 1 is connected to a permanent voltage source 13; the third input 8 of the switching unit 1 is connected to a permanent voltage source 14 of an opposite polarity, and the fourth input 9 thereof is grounded. The linearly varying voltage source 12 uses a conventional circuit based on an integrating DC amplifier, whereas the permanent voltage sources 13 and 14 also use conventional transistor circuits.

The first output 10 of the switching unit 1 is connected via a parallel LC-circuit (comprising an inductance coil 15 and a capacitor 16, connected in parallel) to the input of a DC amplifier 17 with a parallel resistive negative feedback connection (this feedback connection is effected by including a resistor 18 into the feedback circuit of this amplifier). The second output 11 of the switching unit 1 is also connected to the input of the DC amplifier 17 through a reference or standard inductance coil 19. The output of the amplifier 17 is in turn connected to the first input of a comparison unit 20 of which the other input is grounded.

Both the DC amplifier 17 and the comparison unit 20 are parts of a common integrated microcircuit.

The novel device further comprises a control unit 21 including flip-flops 22, 23, 24 and 25, a source 26 of metered time intervals, which source is in the presently described embodiment, in the form of a biased multivibrator using a conventional circuit, and a pulse distributor 27 using a conventional circuit with two flip-flops with count inputs and outputs connected to a diode matrix decoding the state of these flip-flops.

The first output 28 of the pulse distributor 27 is connected to the "0" input of the flip-flop 22 and to the "1" input of the flip-flop 25. The second output 29 of the pulse distributor 27 is connected to the "0" input of the flip-flop 25 and to the metered time interval source 26 the output whereof is connected to the "1" input of the flip-flop 23 and to the "0" input of the flip-flop 24. The third output 30 of the pulse distributor 27 is connected to the "0" input of the flip-flop 23.

A signal from an external source is applied to the "1" inputs of the flip-flops 22 and 24.

The output of the flip-flop 22 is connected to the control inputs of the switches 2 and 4; the outputs of the flip-flops 23 and 24 are connected, respectively, to the control inputs of the switches 3 and 5.

The proposed device further incorporates a time interval measuring unit 31 including a crystal pulser 32 using a conventional transistor circuit, electronic switches 33 and 34, each using a single transistor, and digital counters 35 and 36 which, in the presently described embodiment, are high-frequency decimal pulse counters of conventional circuitry. The output of the pulser 32 is connected to the inputs of the electronic switches 33 and 34 whose outputs are connected, respectively, to the inputs of the digital counters 35 and 36. The control inputs of the electronic switches 33 and 34 are connected, respectively, to the outputs of the flip-flops 23 and 25.

The apparatus for measuring the parameters of a parallel LC-circuit disclosed herein operates as follows.

Initially, the flip-flops 22, 23, 24 and 25 of the unit 21 are in the "0" or zero state. Therewith, due to the potentials across the outputs of these flip-flops, the positions of the switches 2, 3, 4 and 5 of the switching unit 1 are such that the first output 10 of the switching unit 1 and the second output 11 thereof are connected to the fourth input 9 of the same switching unit 1.

A signal from an external source is fed to the "1" inputs of the flip-flops 22 and 24 and brings them to the "1" state. Therefore, the values of the potentials across the outputs of these flip-flops vary, and the switches 2, 4 and 5 switch over to their alternative positions. The first output 10 of the switching unit 1 then becomes connected to the first input 6 thereof, and the second output 11 of the switching unit 1, to the second input 7 thereof. Consequently, applied to the inductance coil 15, having the inductance "L," and to the capacitor 16, having the capacitance "C," both connected in paralle, of the parallel LC-circuit, is a linearly varying voltage "$-kt$" (where "$k$" is the steepness of the linearly varying voltage) from the linearly varying voltage source 12, which is started by an external signal, while applied to the reference inductance coil 19, having the inductance "$L_o$," is a permanent voltage "$+E_o$" from the output of the DC voltage source 13.

For better understanding of the operation of the apparatus disclosed herein, for measuring the parameters of the elements of a parallel LC-circuit, there are shown in FIG. 2 of the appended drawings time diagrams "$a$," "$b$" and "$c$" of the voltages $U_1$, $U_2$, $U_3$, respectively, across the first output of the switching unit, across the second output thereof and across the output of the DC amplifier. The voltages "$-kt$" and "$-E_o$" are represented in diagrams "$a$" and "$b$."

The voltage $U_3$ (FIG. 2, diagram "$c$") across the output of the DC amplifier 17 having a resistor 18 with the resistance "$R_o$" included into the negative parallel feedback a circuit thereof, rises with a jump and then gradually diminishes (for the herein-disclosed apparatus to operate properly, the following condition should be observed: $E_o/\sqrt{2} - L_o \cdot K \geq 1/\sqrt{L/C}$. When this voltage drops to zero, the comparison circuit 20 sends a first signal to the pulse distributor 27, whereby the first output 28 of the latter issues a pulse which brings the flip-flop 25 of the time interval measuring unit 31 to its "1" state. Therefore, the electronic switch 34 opens, or makes, and the pulses from the output of the crystal pulser 32 are applied to the input of the digital counter 36 which starts counting the first time interval "$t_1$" (FIG. 2, diagram "$c$"). Moreover, a pulse from the first output 28 of the pulse distributor 27 brings the flip-flop 22 back to its "0" state. Consequently, the switches 2 and 4 switch over to their alternative positions, and the first output 10 of the switching unit 1 becomes connected to the fourth input 9 thereof, while the second output 11 of the switching unit becomes connected to the third input 8 thereof. As a result, a zero potential is supplied to the parallel LC-circuit (FIG. 2, diagram "$a$"), and a DC voltage "$-E_o$" is applied to the reference inductance coil 19 from the output of the permanent voltage source 14. The voltage $U_3$ across the output of the DC amplifier 17 (FIG. 2, diagram "$c$") drops abruptly, whereafter it starts rising linearly.

When the last-mentioned voltage again reaches the zero value, the comparison unit 20 sends a second signal. Consequently, the second output 29 of the pulse distributor 27 issues a pulse that brings the flip-flop 25 back to its "0" state and starts the metered time interval source 26. The electronic switch 34 closes, or breaks, and the digital counter 36 discontinues counting the time interval "$t_1$."

Following the metered time interval "$T_o$" after the sending of the second signal by the comparison unit 20, the metered time interval source 26 issues a pulse bringing the flip-flop 23 to its "1" state and returning the flip-flop 24 to its "0" state. The electronic switch 33 makes, and the digital counter 35 starts measuring the second time interval "$t_2$" (FIG. 2, diagram "$c$"). Besides, the switches 3 and 5 switch over, whereby the first output 10 of the switching unit 1 then becomes connected to the second input 7 thereof, and the second input of the switching unit 1, to the fourth input 9 thereof. Therefore, the DC voltage "$+E_o$" is supplied across the parallel LC-circuit (FIG. 2, diagram "$a$") from the output of the permanent voltage source 13, while zero potential is supplied to the reference inductance coil 19 (FIG. 2, diagram "$b$"). The voltage across the output of the DC amplifier 17 starts diminishing, and when it falls to a zero value, a third signal is sent from the output of the comparison unit 20, which results in a pulse appearing at the third output 30 of the pulse distributor 27, the latter pulse returning the flip-flop 23 to its initial state. The switch 3 switches over, and the electronic switch 33 breaks. A zero potential is supplied across the parallel LC-circuit, and the digital counter 36 finishes measuring the time interval "$t_2$."

The entire circuitry has now returned to the initial state.

The values of the time intervals "$t_1$" and "$t_2$" measured in the above-described manner are unambiguously representative of the value of the capacitance "C" of the parallel LC-circuit and of the value of the inductance "L" thereof:

$$t_1 = k \cdot L_0/E_0 C$$

$$t_2 = T_0/L_0 L$$

The herein-disclosed device for measuring the parameters of a parallel LC-circuit features fast response, a broad variety of practical applications and a high accuracy of measurement.

When measuring the parameters of individual LC-elements, as well as the parameters of an entire LC-circuit, the herein-disclosed device enables performing the measurement to a high degree of accuracy, owing to the elimination therein of the errors of conversion, introduced by the presence of stray capacitance in the inductance coils and stray inductance in the capacitors, as well as by poor stability of the threshold of the comparison unity and by insufficiently stable output of the voltage sources.

Furthermore, the herein-disclosed device enables reducing the power dispersed in the parallel LC-circuit, and, thereby, to measure the parameters of thin-film LC-elements and to convert the signals of LC-microsensors into time intervals.

Besides, the herein-disclosed device for measuring the elements of a parallel LC-circuit is characterized by simple structure and compact size. Circuits of the above-indicated type or their functions are indicated in the Encyclopedia of Electronics, Charles Susskind, 1962, Reinhold Publishing Corp., New York. The aforementioned electronic switches 2, 3, 4 and 5 are exemplified in "Analog and Digital Analog Electronic Computers," G. Corn, T. Corn; Part I, Theory and Basic Functional Units; Translated from the English; "Mir" Publishers, Moscow 1967, page 302, FIGS. 6-20.

The source 12 of linearly varying voltage can be seen in "Digital Electronic Measuring Instruments," B. I. Shvedsky; Second Edition; "Tekhnika" Publishers, Kiev, 1970, page 99, FIG. 35.

The D.C. voltage sources 13 and 14 are seen in "Compensation Semiconductor Voltage and Current Stabilizers," V. I. Karpov; Second Edition, "Energia" Publishers, Moscow 1967, page 99, FIG. 59.

The comparison unit 20 is found in "Digital Measuring Converters and Instruments," by V. M. Shlyandin; Vyshaya Shkola Publishers, Moscow, 1973, given for typesetting in Oct. 24, 1972, pages 2.34 and 2.35.

The transmitter 26 of a calibrated time interval is seen in "Theory and Calculation of Pulse Circuits Based on Semiconductors Devices," L. M. Goldenberg; Svyaz Publishers, Moscow, 1969, page 308, FIG. 5.17 d.

The pulse distributor 27 is found in "Radio Electronics Handbook" Volumn I, edited by A. A. Kulikovsky, Energia Publishers, Moscow, 1967, page 613, FIGS. 11-114.

The quartz-crystal pulse generator 32 can be found in "Transistorized Pulse Generators," V. N. Yakovlev; Second Edition, Teknika Publishers, Kiev, 1968, page 286, FIG. 151 a.

Electronic switches 33 and 34 are seen in "Analog and Digital-Analog Electronic Computers;" G. Corn, T. Corn; Part I, "Theory and Functional Units;" Translated from the English. Mir Publishers, Moscow 1967, page 302, FIG. 6.20.

The digital counters 35 and 36 are found in "Digital Indication;" M. I. Lerner, A. G. Ryzhevsky, V. M. Shlandin; Energia Publishers, Moscow, 1970, page 30, FIGS. 2–19.

What is claimed is:

1. A device for measuring the parameters of the elements of a parallel LC-circuit comprising: a switching unit including first, second, third and fourth inputs and first and second outputs; a source of linearly varying voltage connected to the first input of said switching unit and adapted for being started by an external signal; a source of permanent voltage connected to the second input of said switching unit; a source of permanent voltage opposite in polarity to that of said first-mentioned source connected to the third input of said switching unit; the fourth input of said switching unit being grounded; a DC amplifier including a parallel resistive negative feedback and an input connected through the parallel LC-circuit to the first output of said switching unit, said DC amplifier further including an output; a reference inductance coil through which said DC amplifier is connected to the second output of said switching unit; a comparison unit connected to the output of said DC amplifier and including an output; a control unit connected to the output of said comparison unit and including an output; and a time interval measuring unit connected to the output of said control unit; said control unit being further coupled to and controlling said switching unit and being further adapted to respond to said external signal, the arrangement being such that, when the output voltage of said DC amplifier equals zero, said comparison unit sends signals to said control unit to change the state of said switching unit such that at the moment of the sending of the external signal said first output of said switching unit is connected to said first input of said switching unit, and said second output of said switching unit is connected to said second input of said switching unit; at the moment when a first signal arrives from said comparison unit, said first output of said switching unit is connected to said fourth input of said switching unit, and the second output of said switching unit is connected to said third input of said switching unit; then following a metered time interval after the arrival of a second signal from said comparison unit, said first output of said switching unit becomes connected to said second input of said switching unit and said second output of said switching unit becomes connected to said fourth input of said switching unit; whereby upon arrival of a third signal from said comparison unit, said first output of said switching unit becomes connected to said fourth input of said switching unit; said control unit controlling said time interval measuring unit so that the initial moment of the first measure time interval which is employed for determining the parameter of one of the elements of said parallel LC-circuit coincides with the moment of the arrival of said first signal from said comparison unit, whereas the final moment of said first time interval coincides with the arrival of said second signal from said comparison unit, the initial moment of the second measure time interval employed for determining the parameter of the other element of said parallel LC-circuit coinciding with the final moment of said metered time interval, and the final moment of said second measured time interval coinciding with the moment of the arrival of said third signal from said comparison unit.

* * * * *